United States Patent [19]
Perret, III

[11] 3,800,575
[45] Apr. 2, 1974

[54] HANDLEBAR BICYCLE LOCK

[76] Inventor: Louis D. Perret, III, 87 River Rd. Box 417, Destrehan, La. 70047

[22] Filed: Dec. 7, 1972

[21] Appl. No.: 313,066

[52] U.S. Cl. ............ 70/233, 24/123 A, 70/58, 74/551.9, 85/67, 350/307
[51] Int. Cl. ................ B62h 5/04, B62h 5/16
[58] Field of Search .......... 24/116 A, 123 A, 128 R; 52/711; 70/227, 233, 234, 236; 74/551.8, 551.9; 85/67; 285/340; 287/58 CT, 80, 126; 294/86.24, 86.25, 94, 96; 350/307; 211/5

[56] References Cited
UNITED STATES PATENTS

| | | | |
|---|---|---|---|
| 1,991,825 | 2/1935 | Strickland | 70/233 |
| 3,404,504 | 10/1968 | Taylor | 85/67 |
| 2,051,822 | 8/1936 | Clarke | 280/289 |
| 2,192,817 | 3/1940 | Sanger et al. | 350/109 |
| 2,712,262 | 7/1955 | Knohl | 85/36 |

FOREIGN PATENTS OR APPLICATIONS

| | | | |
|---|---|---|---|
| 404,570 | 10/1924 | Germany | 70/233 |

Primary Examiner—Albert G. Craig, Jr.

[57] ABSTRACT

A handlebar bicycle lock of the type embodying a resilient cable which is anchored at one end within the handlebar, yet has its free end supported within the handlebar when not in use. The free end of the cable is extensible from one open end of the handlebar so as to encircle a portion of the wheels and frame of the bike, being secured thereto by means of a padlock. The cable and padlock thus lock the handlebars and wheels during non-use. The anchored end of the cable is locked within the handlebar by means of the engagement of an enlarged tip with an expansible ring element supported in the handlebar and the free end of the handlebar includes an enlarged outer stop which is engageable with the padlock hasp in locking position.

1 Claim, 3 Drawing Figures

PATENTED APR 2 1974  3,800,575

HANDLEBAR BICYCLE LOCK

BACKGROUND OF THE INVENTION

1. Field of the Invention

Bicycles, particularly handlebar locks for such bicycles. Earlier inventors have devised complex and elaborate mechanical structures for locking the wheels of the bicycle or locking the handlebars, such that the bicycle cannot be steered in a straingt line. However, such locks for the most part, have not been particularly successful in practice or economically practical in manufacture.

2. Description of the Prior Art

STRICKLAND, U.S. Pat. No. 1,991,825; CLARKE, U.S. Pat. No. 2,051,822; WEST GERMANY, U.S. Pat. No. 404,570 (1924).

These earlier patents teach the employment of cable means, which are extended from the handlebar or frame of the bicycle to encircle the bicycle spokes or to attach to a frame element.

Strickland's anti-theft device is extensible from one end of the handlebar to an especial locking bracket 21 with special tumbler 17, attached to the longitudinal frame portion 12 adjacent the handlebars. Strickland's especial cable end mating relationship with the lock 21 is illustrated in FIG. 3.

Clarke's bicycle locking cable is supported within the bicycle frame and is extensible through a longitudinal portion of the frame, thence through the bicycle spokes. An especial ring 26 is required to be mounted at the end of the Clarke cable so as to be engageable with a padlock. In West Germany, Pat. No. 404,570, the locking cable includes as in Clarke, an especial locking ring at the end of the cable.

None of the prior art references suggest a cable mounted within the handlebar and of sufficient length to encircle the rear wheels and frame, as well as a lamp post pillar or other stationary element. Each of the prior art devices includes an especial cable end locking ring or mating prong. There is no suggestion in the prior art of a simple enlarged circular element which can abut the padlock hasp and in itself serve as a decorative or reflective element mounted on the handlebar end.

SUMMARY OF THE INVENTION

According to the present invention the handlebar bicycle lock includes an elongate cable supportable within a hollow bicycle bar and having an enlarged inner tip; an enlarged outer stop engageable with the handlebar open end, and an expansible ring member encircling the cable and supported within the inner end so as to engage said inner tip as said outer stop and cable are withdrawn. The enlarged outer stop and the free end of the withdrawn cable may encircle rear wheels and frame, so as to be secured by a conventional padlock hasp.

DESCRIPTION OF THE PREFERRED EMBODIMENTS

Figure 1:
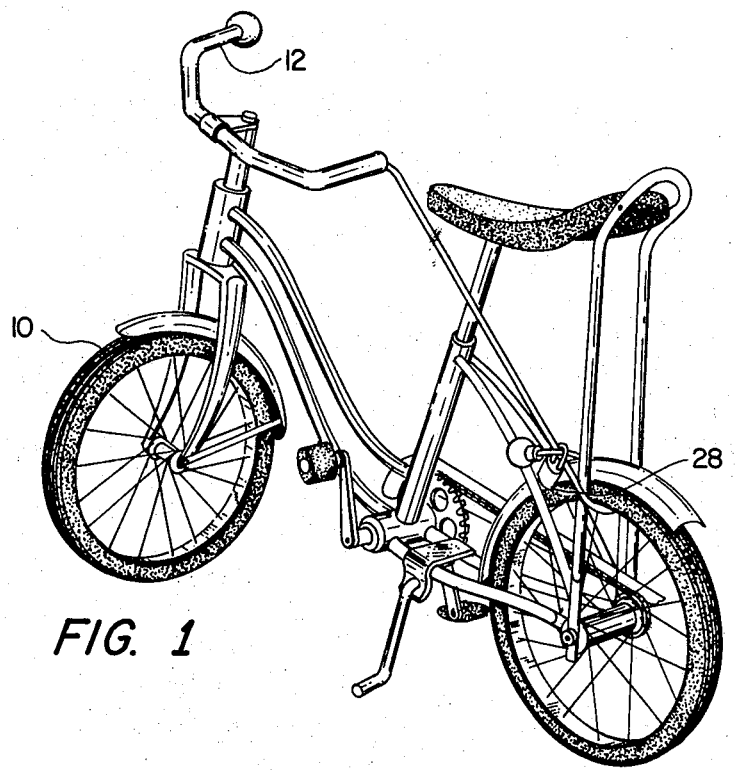
FIG. 1 is a perspective view of a bicycle locked with the expansible cable and padlock, according to the present invention.

In FIG. 1 a conventional bicycle of the frame type is illustrated as including front wheel 10, open ended handlebar 12 and an elongate locking cable assembly secured by conventional hasp type padlock 28.

Figure 2:
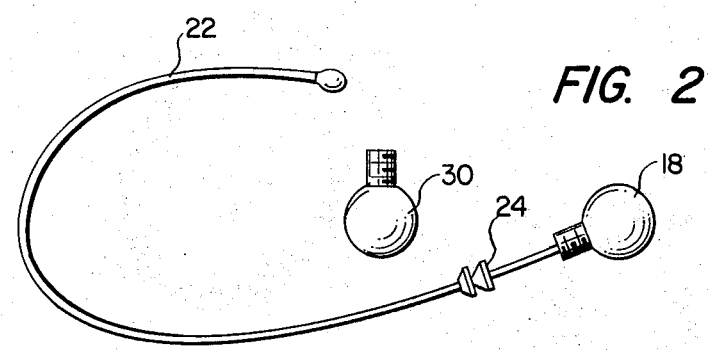
FIG. 2 is an exploded view of the locking cable, with inner tip, ring like expansible member and enlarged outer stop.
Figure 3:
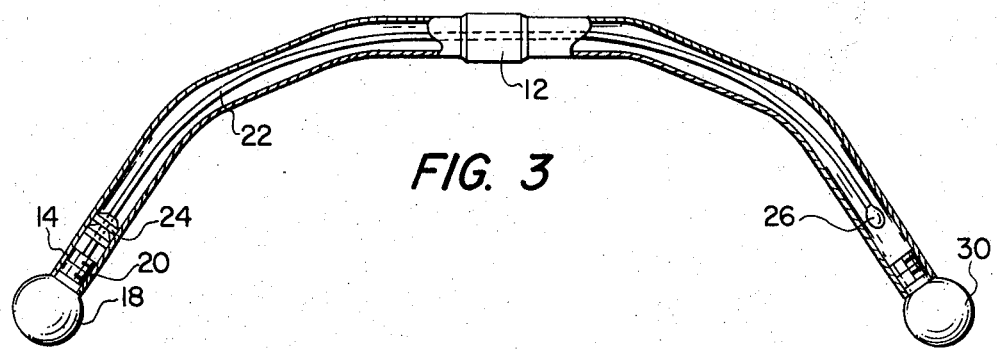
FIG. 3 is a horizontal section of the handlebar, showing the locking cable supported therein, as well as a decorative or reflective mating outer stop complementally engaging the open end of the handlebar.

In FIGS. 2 and 3, the locking assembly is illustrated as particularly including elongate cable 22, having enlarged inner tip 26 and an enlarged outer stop 18, with a narrowed male element 20 complementally engageable with the open end of the handlebar. An expansible ring lock 24 encircles the cable and is supported within the open end of the handlebar. As the cable is withdrawn, tip 26 engages stop 24 locking the cable against further extension. The entire assembly may be simply mounted within the handlebar by pushing the cable inward, while axially urging the stop 24 several inches within the handlebar.

As illustrated in FIG. 1, the cable may be withdrawn to encircle the rear wheel and frame or alternatively, the cable may be used to encircle a lamp post member or the like, the doubled over free end portion of the cable being secured by the hasp element of the conventional padlock 28. Such a padlock hasp must, of course, be of lesser diameter than outer stop 18. A conventional hasp-type padlock has been illustrated. However, various other types of locking elements encircling or attachable to the free end of the cable could be employed.

The enlarged outer stop 18 may serve not only as a decorative and stopping function, but may also be manufactured to include a reflecting composition, as may be the decorative mating enlarged stop 30 which is inserted in the opposite open end of the handlebar. The cable itself may be as long as thirty inches in order to be encircled around the rear end of the handlebar.

Manifestly, the cable, the inner and outer stops as well as the expansible ring member and padlock may be altered without departing from the spirit of invention.

I claim:

1. In a bicycle of the type embodying a frame, rotatable wheels and an open end handlebar attached to said frame, a lock comprising:
   A. an elongate cable freely supported within said handlebar and having:
      i. an inner tip;
      ii. an expansion member encircling said cable, while supported within said handlebar; and
      iii. an enlarged diameter outer stop having a reflective exterior; and
   B. a padlock of the hasp type encircling doubled over portions of said cable as they are withdrawn from said handlebar and encircle a portion of the frame of said bicycle.

* * * * *